March 9, 1926. 1,575,727
A. UHLYARIK
RADIATOR FOR AUTOMOBILES AND OTHER MOTOR VEHICLES
Filed May 23, 1922 3 Sheets-Sheet 2
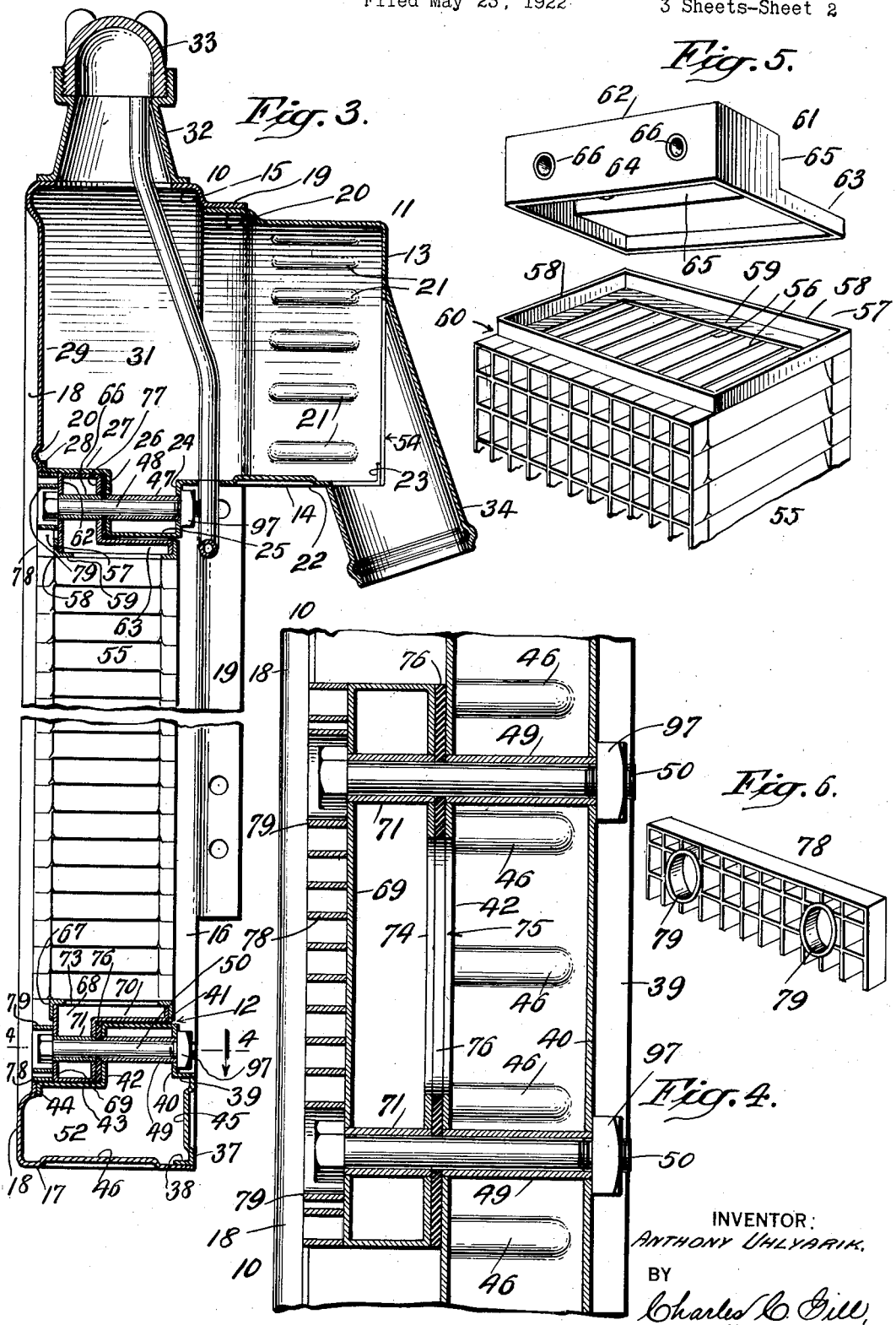
INVENTOR:
ANTHONY UHLYARIK.
BY
Charles C. Gill,
ATTORNEY.

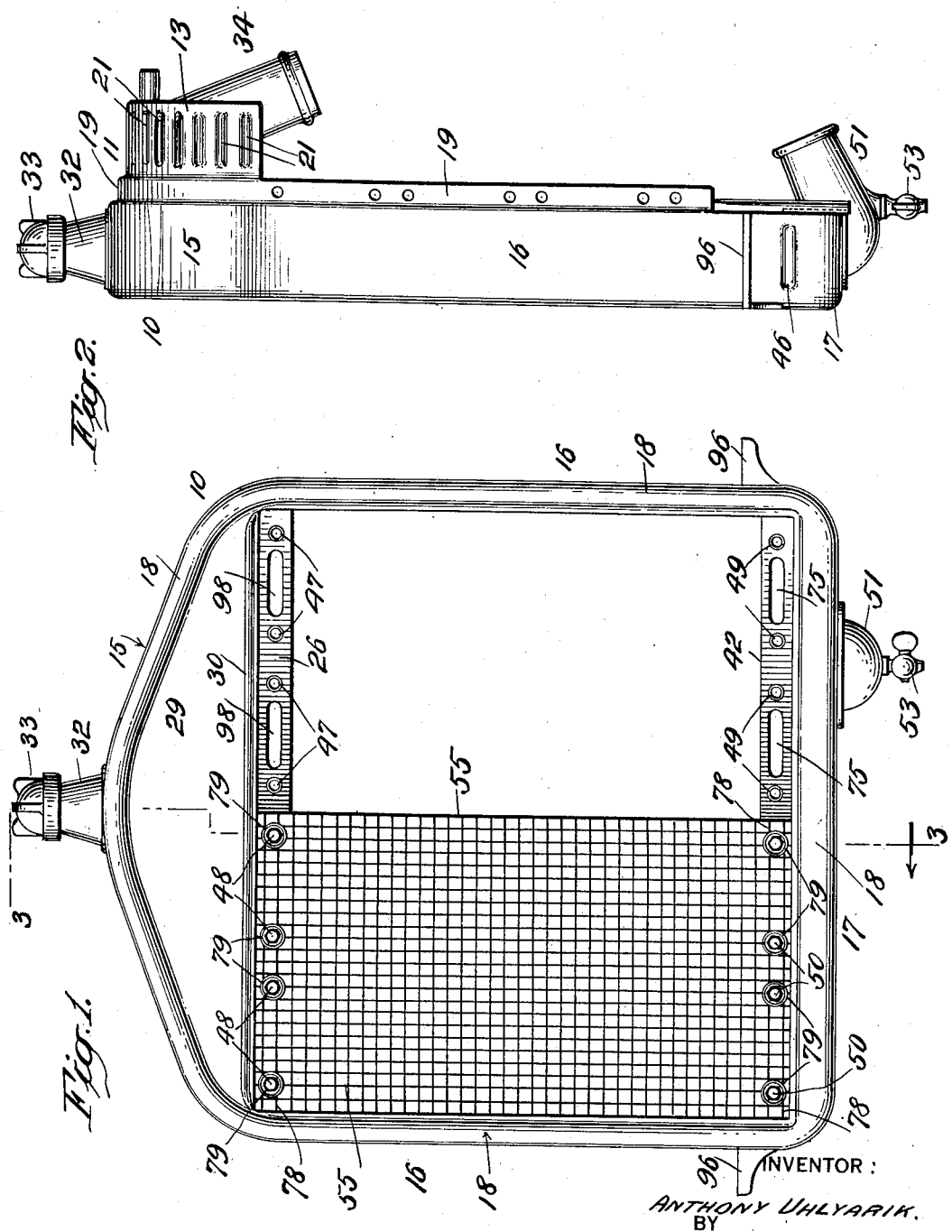

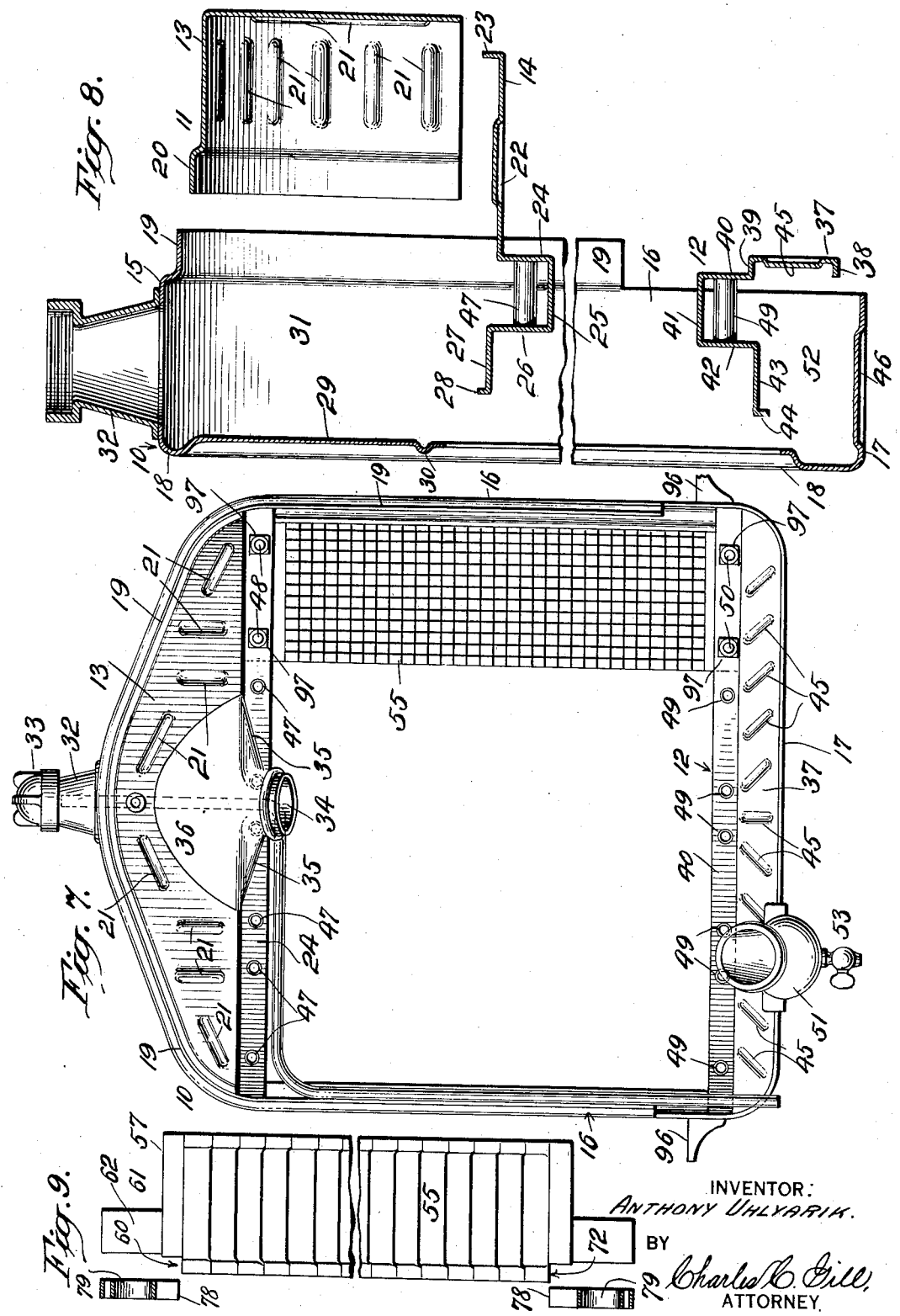

Patented Mar. 9, 1926.

1,575,727

UNITED STATES PATENT OFFICE.

ANTHONY UHLYARIK, OF CLEVELAND, OHIO, ASSIGNOR TO EMANUEL J. UHLYARIK, OF CLEVELAND, OHIO.

RADIATOR FOR AUTOMOBILES AND OTHER MOTOR VEHICLES.

Application filed May 23, 1922. Serial No. 562,968.

*To all whom it may concern:*

Be it known that I, ANTHONY UHLYARIK, a citizen of Czechoslovakia, and a resident of Cleveland, in the county of Cuyahoga and State of Ohio, have invented certain new and useful Improvements in Radiators for Automobiles and Other Motor Vehicles, of which the following is a specification.

The invention relates to improvements in radiators of the character employed on automobiles, motor vehicles and the like, for cooling the water which circulates in jackets surrounding the engine cylinders.

One purpose of my invention is to provide a highly efficient radiator of very durable construction and made up from a minimum number of readily constructed and assembled parts.

A special feature of the invention resides in the construction of the main radiator frame which is in one piece of heavy gauge sheet iron and to which is brazed a few other parts of like nature to complete the upper and lower tanks, the framing thus constructed being capable of being galvanized.

The radiator frame is adapted to receive cooling units of efficient type and which units are separately applicable to and removable from the frame and hence on an injury to any one unit it may be removed and a new unit substituted therefor.

The headers for the cooling units, their application thereto and the formation of the radiator frame in the relation of the same to said headers, present features of novelty and advantage and result in a cooperative construction wherein the several cooling units become efficiently and detachably secured to and protected by said frame. Those portions or sections of the cooling units intermediate or between the headers thereof may be of any of the several well known and approved types, my invention not being limited to any special construction of these sections, whether they be of the cellular, tubular, honey-comb or other detailed formation. I show in the drawings one well-known and efficient type of cooling section formation but do not confine my invention thereto.

The invention will be fully understood from the detailed description hereinafter presented, reference being had to the accompanying drawings, in which:

Fig. 1 is a front elevation, with certain of the water-cooling units omitted, of an automobile radiator constructed in accordance with and embodying the invention;

Fig. 2 is a side elevation of the same;

Fig. 3 is a vertical section, partly broken away and on a larger scale, through the same taken on the dotted line 3—3 of Fig. 1;

Fig. 4 is a horizontal section, on a larger scale, through a portion of the same, taken on the dotted line 4—4 of Fig. 3;

Fig. 5 illustrates in perspective the upper portion of one of the cooling units and the header cap to be applied thereon;

Fig. 6 is a detached perspective view of a finishing section for the front portions of the upper and lower ends of the cooling units;

Fig. 7 is a back view, with some of the cooling units omitted, of the automobile radiator;

Fig. 8 is a vertical section through four main casing parts of the radiator, the same being shown unassembled and in position to be assembled and brazed together to form the unitary shell of the radiator, and Fig. 9 is a side elevation, partly broken away, of one of the cooling units, with the upper and lower finishing sections therefor, corresponding with Fig. 6, shown in section and in position to be applied to the upper and lower caps of said unit.

The shell of the radiator comprises three principal parts, to-wit, a main frame 10, an upper tank-section 11 and a lower tank-section 12, the frame 10 being in one integral stamping, the tank-section 11 comprising an upper hood portion 13 and a bottom section 14 brazed thereto, and the lower tank section 12 being in one integral stamping. The parts 10 to 14 inclusive are shown in unassembled relation in Fig. 8, but in position to indicate their proper assembly.

The main frame 10 comprises an arched top 15, vertical sides 16 and a bottom 17, and these portions of the main frame are along their front edges beaded, as at 18, the beading 18 extending entirely around the frame and projecting forwardly thereof and constituting an ornamental framing and as means for strengthening the frame 10.

At its back, the frame 10 is formed with a backwardly projecting flange 19 which is offset inwardly from the adjacent portions of the sides and top of the frame and extends vertically along said sides and top and to nearly the lower end of said sides, as shown in Fig. 2. The flange 19 adds material strength to the main frame 10, as well as serving other duties.

The hood portion 13 of the upper tank section 11 is formed along its top and sides with an outwardly offset flange 20, and this flange 20 in the assembly of the parts of the radiator is set within and brazed to the inner surface of the flange 19, as shown in Fig. 3, so that in effect the said hood portion becomes integral with the frame 10. The hood portion 13 aforesaid extends entirely across the upper back portion of the main frame 10, as shown in Fig. 7, and said portion 13 is formed in its sides and back with a series of well-distributed corrugations 21 which add material stiffness and strength to said portion 13 and permit it to be successfully brazed, without distortion, to the flange 19 of the frame 10. The corrugations 21 also add durability to the upper tank section 11 and enable it to resist the rough handling to which automobile parts are frequently subjected.

The bottom 14 of the upper tank of the radiator is formed from sheet metal and comprises in one piece a horizontal member 22, an upwardly extending flange 23 along the rear edge thereof, a downwardly extending member 24 at the forward edge of the part 22, a horizontal member 25 extending forwardly from the lower edge of the part 24, an upwardly extending member 26 parallel with the member 24, and a forwardly extending member 27 in one part with the upper front edge of the part 26 and having at its front edge an upwardly extending flange 28. The tank bottom member 14 extends across the entire width of the main frame 10 and is fitted up within the lower edges of the hood member 13, said flange 23 standing within the lower edge of said member 13 and being brazed thereto, as shown in Fig. 3, said bottom 14 thus leaving no exposed joint at the back of the upper tank. The members 24, 25, 26 and 27 of the tank bottom section 14 set within the frame 10 and are brazed at their side edges to the sides thereof, and the flange 28 at the forward edge of the member 27 is brazed to the upper front portion 29 of said frame 10 just below a forwardly projecting beading or corrugation 30 therein, as shown in Fig. 3, whereby the tank bottom 14 becomes secured not only to the lower rear edge of the hood 13, but also to the front 29 of the frame 10. The upper tank extends entirely across the upper portion of the radiator and comprises a chamber 31 within the upper part of the main frame 10, as shown in Fig. 3, and also the chamber formed within the hood member 13, the two chambers providing a very commodious upper tank for the radiator and which tank is defined by the frame 10, hood 13 and bottom member 14.

The main frame 10 is provided with a top filling-nozzle 32 having a cap 33, as usual, and the aforesaid top tank has an inlet nozzle 34 brazed thereto through which the circulating water is returned from the cylinder jackets to said tank. The upper portion of the nozzle is broadened out, as shown in Fig. 7, to form flanges 35 extending below and fitting against the tank-bottom 14 and an arcuate flange or body 36 fitting against the back of the hood 13, and said flanges when brazed to the tank parts afford a substantial construction securing the nozzle 34 and imparting strength to the adjacent parts of the radiator.

The tank at the bottom of the radiator shell is formed in part by the bottom, sides and lower front portion of the main frame 10 in connection with the lower or bottom tank section 12, shown in section in Figs. 3 and 8, Fig. 8 illustrating the section 12 as ready to be positioned within the main frame 10 and Fig. 3 showing said section 10 in its final position. The section 12 comprises a rear face member 37 having at its lower edge a forwardly projected flange 38 and at its upper edge a forwardly projected member 39, whence said section 12 is formed with a vertical member 40 extending upwardly from the forward edge of the part 39, a forwardly projecting member 41, a downwardly projecting member 42 standing parallel with the member 40, a forwardly projecting member 43, and a downwardly extending flange 44 at the front edge thereof. The tank section 12 is inserted between the sides of and secured to the main frame 10, and its lower flange 38 is brazed to the bottom 17 of said frame 10 at the rear edge thereof, while the forward flange 44 of said section 12 is brazed to the inner surface of the lower front portion of the frame 10 along a line just above the beading 18 which extends across the front of the lower end of the frame 10. In order to strengthen the lower tank portion of the radiator shell and to permit without distortion of the same the brazing of the lower tank section 12 and main frame 10 together, as shown in Fig. 3, the member 37 of said section 12 is formed with a series of corrugations 45 and the frame 10 in its bottom 17 is formed with a series of horizontal corrugations 46, the corrugations 45 being inclined downwardly and outwardly at the sides of the vertical center of said member 37, as more particularly shown in Fig. 7.

Between the parallel vertical members 24, 26 and extending horizontally are firmly secured a series of sleeves 47 for use in receiving bolts 48, hereinafter referred to, and between the parallel vertical members 40, 42 of the lower tank section 12 are secured a number of horizontal sleeves 49 to receive bolts 50, hereinafter referred to, said sleeves 47 opening through their sustaining members 24, 26, and the sleeves 49 opening at their ends through their sustaining members 40, 42.

I secure by brazing or otherwise to the bottom of the radiator shell an outlet nozzle 51 shown in Figs. 1, 2 and 7, this nozzle being provided to receive connections leading to the jackets of the engine cylinders and being in communication with the bottom chamber 52 of the radiator casing and which chamber constitutes the bottom tank into which the water finds its way from the upper tank chamber formed at the top of the radiator shell. The nozzle 51 will preferably be equipped with a drip cock 53 and may be of any suitable or desirable form or construction. The inlet nozzle 34 for the return of the water to the upper tank of the radiator is in communication through an opening 54 with the upper tank, said opening 54 being formed in the back wall of the hood 13 and adjacent bottom portion of the tank section 14, as shown in Fig. 3, and being concealed and protected by the flanges 35, 36 of said nozzle member 34.

Between the upper and lower tanks of the radiator shell I secure a number of water-cooling units 55 of any suitable type permitting the water to find its way through the same from the upper tank to the lower tank. A number of different constructions of the cooling units are well known commercially and otherwise, and I make use of any of these various types of cooling units, providing on them however certain features which are new with me and which cooperate with the construction I present of the bottom section 14 for the upper tank and the section 12 for the lower tank, whereby I am permitted in an effective manner to secure said units detachably in position between the tanks and to said sections 14, 12, which are brazed to the frame 10 and therefore in effect integral therewith and afford, in the construction presented by me, efficient and adequate bearing surfaces to receive the cooling units. I have illustrated the use of four of the cooling units 55, but I do not limit my invention to the employment of any special number of the units 55 so long as they fill the space between the sides 16 of the frame 10 and the upper and lower tanks, so as to present a proper front finish to the radiator.

The units 55 each comprises a series of cells or the like, and in the present instance referring to Fig. 5 inlet ports 56 are formed for the passage of the water from the top tank down through the cells to the bottom tank, and on the top of the unit I, in a water-tight manner, secure a rectangular frame 57 having a vertical encompassing flange 58 and a horizontal flange 59 directly secured to the top of the members of the unit 55. The frame 57 is set backwardly from the front edge of the unit 55 as indicated in Fig. 5, at 60. Upon the top of the frame 57 and seated within the flange 58 and upon the the horizontal flange 59 I secure a header 61 consisting of a hollow frame having a forward elevated portion 62 and a lower rear portion 63; said portion 62 affords front and back walls 64, 65 which are apertured and have secured therein and extending through said walls, the sleeves 66 which receive portions of the bolts 48 hereinbefore referred to and as illustrated in Fig. 3. The headers 61 are through their back walls 65 in communication with the chamber 31 of the upper tank, and hence the water in said tank will flow into the headers 61 and pass thence through the various ports or channels 56 below each header into the ramified passages extending downwardly through the unit 55 to the lower tank chamber 52. The headers 61 are securely soldered in place within the frames 57 and each unit 55 is thus in effect one integral piece.

I provide on the lower end of each unit 55 a frame 67 corresponding with the frame 57 of Fig. 5, but inverted, and within each of the frames 67 I secure a header 68 corresponding with the header 61 of Fig. 5, but inverted, as shown in Fig. 3. The header 68 has a depending front portion 69 corresponding with the part 62 of Fig. 5 and a rear shallower portion 70 corresponding with the shallow portion 63 of the header 61 shown in Fig. 5. Between the parallel depending members of the part 69 of the headers 68 are secured sleeves 71 open at their ends and receiving portions of the bolts 50 hereinbefore referred to, the sleeves 71 corresponding with the sleeves 66 of the upper headers 61. The headers 68 are spaced rearwardly from the front plane of the units 55 leaving a space at the front of said headers, as shown in Fig. 3, and indicated in Fig. 9 at the numeral 72, wherein the space 60 at the front of the top of the unit is also indicated. The frame 67 is open at its central portion, as at 73, for the escape of the water from the units into the headers 68, and in the back wall of the forward portion of the headers 68 are formed openings 74 which align with openings 75 in the vertical member 42 of the lower tank section 12, whereby the lower tank 52 is placed into communication with the lower heads 68 and is permitted to receive the cool water therefrom. I interpose a packing material 76 between the back wall of the front portion of the headers 68 and the adjacent surface of the member 42 of the bottom tank section 12, as shown in Fig. 4, thereby making a water-tight joint. The openings 74, 75 and packing material 76 are duplicated at the back wall 65 of the upper headers 61 and the adjacent wall 26 of the upper tank section 14, the connection of the upper headers 61 with the upper tank chamber 31 being at 98, Fig. 1, and like the connection of the lower tank 52 with the lower headers 68. The packing material between the top headers 61 and the member 26 of the upper tank section 14 is numbered 77. The units 55 have their upper and lower headers rigidly and permanently secured thereto, and these units are separately secured in position against the upper tank bottom section 14 and the lower tank section 12 by means of the bolts 48, 50 hereinbefore referred to. The bolts 48 have heads on their forward ends and extend through the sleeves 66, 47 and at their rear ends receive nuts which, when tightened, serve to firmly bind the upper headers 61 against the packing material 77 and the vertical member 26 of the tank section 14. The bolts 50 have heads on their forward ends, as shown in Fig. 3, and extend through the sleeves 71, 49 and have nuts on their rear ends which, when tightened, serve to draw the lower headers 68 rearwardly against the packing material 76 and the vertical member 42 of the lower tank section 12.

On reference to Fig. 3 it may be seen that the lower back portions 63 of the headers 61, extend below the member 25 of the tank section 14, that the vertical back walls 65 of the forward portion of the headers 61 are parallel with the vertical member 26 of said section 14 and that said member 26 affords a bearing for said headers, and that the top of the forward portion 62 of the headers 61 are immediately below the horizontal member 27 of the tank section 14. In respect to the lower headers 68 the shallower back portions 70 thereof are upon the horizontal member 41 of the lower tank section 12, and the vertical member 42 of said section 12 is parallel with and affords backing for the back vertical wall of the front part of the headers 68, while the lower surface of the forward portion of the headers 68 is upon the horizontal member 43 of the lower tank section 12.

The forward portions of the upper and lower headers 61, 68 are set back from the vertical plane of the front of the units 55 so as to afford seats for the heads of the bolts 48, 50 and avoid any forward projection of said heads. In order however to provide an attractive finish for the upper and lower end edges of the radiator units, at the spaces 60, 72 hereinbefore referred to, I solder to the front faces of said headers 61, 68 artificial fins or blocks of fins 78, one at each end, shown in Fig. 6. These blocks 78 occupy the spaces 60, 72 at the upper and lower front edges of the units 55 (Fig. 9) and their front faces are on the vertical plane of the front of the body of the units. The blocks 78 are each in one unitary piece and formed with horizontal sleeves 79 which receive the heads of the bolts 48, 50 and also permit the insertion of a spanner to engage said heads and screw the bolts into their nuts 97 applied to the rear ends of the bolts for tightening said bolts and nuts.

I regard it of special importance to construct the upper and lower tank sections 14, 12 in the manner hereinbefore described, with the members 24, 25, 26 and 27 on the tank section 14 and the members 37, 39, 40, 41, 42 and 43 on the tank section 12, since these sections, when thus constructed, adequately, durably and efficiently receive the headers 61, 68 of the cooling units 55, as clearly represented in Fig. 3, and also permit said units to be independently removed through the front of the radiator shell, so that when any one unit becomes impaired a substitute unit may be introduced into its place. The nuts on the upper bolts 48 may be held stationary while the bolts 48 are screwed into them by means of a spanner applied to the head of the bolts, and it may be seen on reference to Fig. 3 that the adjacent bottom portion 22 of the upper tank section 14 near the vertical member 24 thereof will serve to prevent the rotation of the nuts on the bolts 48 during the application and tightening of the bolts in position. The nuts on the lower bolts 50 are directly over the forward bend 39 of the lower tank section 12, and this portion 39 of said section will serve to prevent the rotation of the nuts when the bolts 50 are being applied thereto and also serve to prevent the loss of the nuts from the bolts 50 during the travel of the vehicle employing the radiator. The fact that the nuts on the upper bolts 48 are prevented from rotating by the proximity thereto of the bottom member 22 of the tank section 14 is also an assurance that those nuts will not be lost off of the bolts 48 during the use of the radiator. The packing material 76, 77, introduced between the upper and lower headers 61, 68 and the adjacent surfaces 26, 42 of the tank sections not only serve the functions hereinbefore described, but being yielding places a tension on the bolts 48, 50 against the threads of the nuts on said bolts, and this serves to aid in preventing the loosening of the nuts or the loosening of the connected parts of the radiator.

A further special feature of my invention resides in the main frame 10 being in one integral stamping, with the upper and lower tank sections comprised in the hood 13, section 14, and section 12 brazed to said frame, so that the entire shell of the radiator becomes in effect one integral unitary piece which may be galvanized and then finished off by the application of the other portions of the radiator thereto in the manner hereinbefore described.

I have sought to provide a very greatly improved radiator of efficiency and durability and one of attractive appearance and possessing cooling units which may be independently removed from or applied thereto. The details of the construction hereinbefore pointed out in themselves are of importance, since they permit of a ready construction of the radiator possessing the advantages indicated, without complication or undue expense of manufacture.

The rear flanges 19 provided along the sides 16 of the main frame or shell 10 afford means for securing the radiator in position on an automobile, and in addition I equip the lower opposite sides of the radiator with customary brackets 96 for convenience in applying the radiator to position.

The operation of the invention will be understood without further special detailed explanation. Water may be fed to the radiator through the nozzle 32 at any time. When the radiator is in use the water from the top tank thereof will constantly travel down in fine streams through the units 55 and enter the bottom tank 52 and thence pass to the jackets of the engine cylinders, whence the water will be returned, for cooling, up through the nozzle 34 and enter the top tank, from which the water will, as before, find its way down through the cooling units 55 into the bottom tank 52 and pass thence through the nozzle 51 and its connections to the jackets of the engine cylinders. The water from the top tank passes into the upper headers or caps 61 of the several units 55, and hence there is always a body of water immediately confined at the top of the units for supplying said units. The lower headers 68 collect the water from the units 55 and discharge the same into the bottom tank 52.

I have described the radiator in considerable detail because of the importance of the special features of construction shown. I do not, however, limit my invention to all of the details shown and described, since I am aware that many of them may be modified within the spirit and scope of my invention as claimed.

What I claim as my invention and desire to secure by Letters Patent, is:

1. A radiator of the character described comprising a main frame in one integral stamping consisting of vertical side members, a top portion connecting said sides at their upper ends and having a top and front and forming in part the upper tank and a bottom portion connecting said sides at their lower ends and having a bottom and front and forming in part the lower tank; back and bottom members for said upper tank secured to said main frame and to each other, back and top members for said lower tank secured to said main frame, and removable cooling units secured between said upper and lower tanks and in communication therewith, said upper tank having an inlet for the circulating water and said lower tank an outlet for said water, said bottom member for the upper tank being brazed to the lower portion of the upper front part of the main frame and having between the sides of said frame a rear depressed section affording spaced apart parallel walls connected by a series of sleeves, said top member for the lower tank being brazed to the inner surface of the lower front portion of the main frame and having between the sides of said frame a rear raised section affording spaced apart parallel walls connected by a series of sleeves, and said units having upper and lower headers respectively faced against said depressed and raised sections and secured thereto by bolts extending through them and said sleeves.

2. An automobile radiator comprising a main frame consisting of vertical side members, a top portion connecting said sides at their upper ends and having a top and front and forming in part the upper tank and a bottom portion connecting said sides at their lower ends and having a bottom and front and forming in part the lower tank, back and bottom members for said upper tank secured to said main frame and completing the upper tank, back and top members secured to said main frame and completing the lower tank, said upper tank having an inlet for the circulating water and said lower tank an outlet for said water, independent cooling units interposed between said upper and lower tanks and being in communication therewith, and means bolting said cooling units to the bottom of the upper tank and the top of the lower tank, said cooling units having rectangular hollow frames secured on their upper and lower ends and headers secured to said frames, each header comprising a shallow rear portion and a vertically extended front portion at the back of which each header has a vertical wall, and the bottom of the upper tank conforming to the upper surface of the upper headers and the vertical walls thereof, and the top of the lower tank conforming to the lower surface of the lower headers and the vertical walls thereof, whereby the bottom of the upper tank and the top of the lower tank afford receiving seats and spaces for the headers on said units.

3. An automobile radiator comprising a main frame consisting of vertical side members, a top portion connecting said sides at their upper ends and having a top and front and forming in part the upper tank and a bottom portion connecting said sides at their lower ends and having a bottom and front and forming in part the lower tank, back and bottom members for said upper tank secured to said main frame and completing the upper tank, back and top members secured to said main frame and completing the lower tank, said upper tank having an inlet for the circulating water and said lower tank an outlet for said water, independent cooling units interposed between said upper and lower tanks and being in communication therewith, and means bolting said cooling units to the bottom of the upper tank and the top of the lower tank, said cooling units having rectangular hollow frames secured on their upper and lower ends back from the front plane of said units, headers secured to said frames and each having a shallow rear portion and a vertically extended front portion also set backwardly from the front plane of the units and each having a vertical wall at the front of its shallow portion, and fin sections secured to said headers at their vertical front surfaces and occupying the spaces created by the inwardly offsetting of said rectangular frames and headers, and the bottom of the upper tank conforming to the upper surface of the upper headers and the vertical walls thereof, and the top of the lower tank conforming to the lower surface of the lower headers and the vertical walls thereof, whereby the bottom of the upper tank and the top of the lower tank afford receiving seats and spaces for the headers on said units.

Signed at Cleveland, in the county of Cuyahoga and State of Ohio, this 9th day of May, A. D. 1922.

ANTHONY UHLYARIK.